US009578009B2

(12) United States Patent
Hopkins et al.

(10) Patent No.: US 9,578,009 B2
(45) Date of Patent: Feb. 21, 2017

(54) SYSTEM AND METHOD FOR SUPPORTING SECURITY IN A MULTITENANT APPLICATION SERVER ENVIRONMENT

(71) Applicant: Oracle International Corporation, Redwood Shores, CA (US)

(72) Inventors: William S. Hopkins, Burlington, MA (US); Craig Perez, Nashua, NH (US); David A. Guy, Burlington, MA (US); Peter Bower, Hollis, NH (US); Juan Li, Needham, MA (US); Jeff J. Tancill, Merrimack, NH (US); Krishna Sriramadhesikan, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 49 days.

(21) Appl. No.: 14/747,778

(22) Filed: Jun. 23, 2015

(65) Prior Publication Data
US 2015/0373004 A1    Dec. 24, 2015

Related U.S. Application Data

(60) Provisional application No. 62/016,058, filed on Jun. 23, 2014, provisional application No. 62/054,912, filed on Sep. 24, 2014.

(51) Int. Cl.
*G06F 15/16* (2006.01)
*H04L 29/06* (2006.01)
(Continued)

(52) U.S. Cl.
CPC ......... *H04L 63/08* (2013.01); *G06F 17/30584* (2013.01); *G06F 21/604* (2013.01);
(Continued)

(58) Field of Classification Search
CPC ........ H04L 63/08; H04L 63/105; H04L 67/02; H04L 67/10; H04L 47/70; G06F 21/62; G06F 21/604; G06F 17/30584
See application file for complete search history.

(56) References Cited

U.S. PATENT DOCUMENTS

2010/0274910 A1    10/2010  Ghanaie-Sichanie et al.
2012/0096521 A1*    4/2012  Peddada ............... G06F 21/629
                                                            726/4
(Continued)

OTHER PUBLICATIONS

European Patent Office, International Searching Authority, International Search Report and Written Opinion dated Sep. 23, 2015 for International Patent Application PCT/US2015/037270, 9 pages.

*Primary Examiner* — Michael S McNally
*Assistant Examiner* — Khoi Le
(74) *Attorney, Agent, or Firm* — Tucker Ellis LLP

(57) ABSTRACT

In accordance with an embodiment, described herein is a system and method for providing security in a multitenant application server environment. In accordance with an embodiment, per-partition security configuration includes: per-partition security realm (including configuration for authentication, authorization, credential mapping, auditing, password validation, certificate validation, and user lockout); SSL configuration, including keys, certificates, and other configuration attributes; and access control for partition and global resources. An administrator can designate one or more partition users as partition administrators, via grant of roles.

19 Claims, 9 Drawing Sheets

(51) Int. Cl.
*G06F 21/60* (2013.01)
*H04L 29/08* (2006.01)
*H04L 12/911* (2013.01)
*G06F 17/30* (2006.01)
*G06F 21/62* (2013.01)

(52) U.S. Cl.
CPC .............. *G06F 21/62* (2013.01); *H04L 47/70* (2013.01); *H04L 63/105* (2013.01); *H04L 67/02* (2013.01); *H04L 67/10* (2013.01)

(56) References Cited

U.S. PATENT DOCUMENTS

| | | | |
|---|---|---|---|
| 2012/0150912 A1* | 6/2012 | Ripberger | ............... G06F 21/80 707/786 |
| 2013/0007891 A1 | 1/2013 | Mogaki | |
| 2014/0013325 A1* | 1/2014 | Shimoni | ............ G06F 9/45558 718/1 |
| 2014/0123316 A1* | 5/2014 | Leggette | ............ H04L 67/1097 726/28 |

* cited by examiner

SYSTEM AND METHOD FOR SUPPORTING SECURITY IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application No. 62/016,058, filed Jun. 23, 2014 titled "SYSTEM AND METHOD FOR SUPPORTING SECURITY IN A MULTITENANT APPLICATION SERVER ENVIRONMENT"; and U.S. Provisional Application No. 62/054,912, filed Sep. 24, 2014 titled "SYSTEM AND METHOD FOR SUPPORTING SECURITY IN A MULTITENANT APPLICATION SERVER ENVIRONMENT"; and is related to:

U.S. patent application Ser. No. 14/601,883, filed Jan. 21, 2015 titled "SYSTEM AND METHOD FOR SUPPORTING MULTI-TENANCY IN AN APPLICATION SERVER, CLOUD, OR OTHER ENVIRONMENT"; each of which above applications are herein incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for providing security in a multitenant application server environment.

BACKGROUND

Software application servers, examples of which include Oracle WebLogic Server (WLS) and Glassfish, generally provide a managed environment for running enterprise software applications. Recently, technologies have also been developed for use in cloud environments, which allow users or tenants to develop and run their applications within the cloud environment, and to take advantage of distributed resources provided by the environment.

SUMMARY

In accordance with an embodiment, described herein is a system and method for providing security in a multitenant application server environment. In accordance with an embodiment, per-partition security configuration includes: per-partition security realm (including configuration for authentication, authorization, credential mapping, auditing, password validation, certificate validation, and user lockout); SSL configuration, including keys, certificates, and other configuration attributes; and access control for partition and global resources. Administrator can designate one or more partition users as partition administrators, via grant of roles.

DETAILED DESCRIPTION

Figure 6:
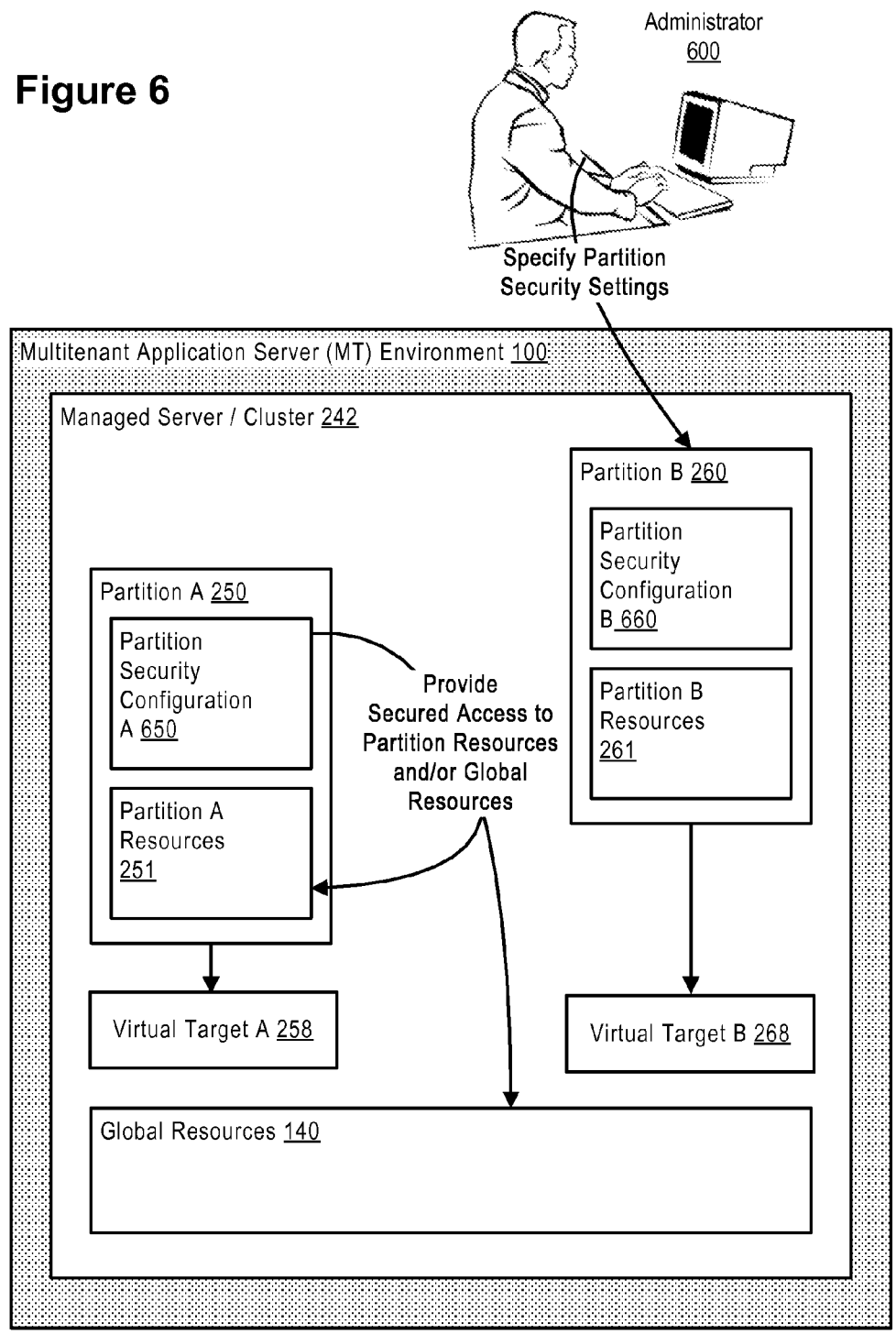
FIG. 6 illustrates general functionality of a system and method for supporting security in a multi-tenant environment in accordance with an embodiment.
Figure 7:
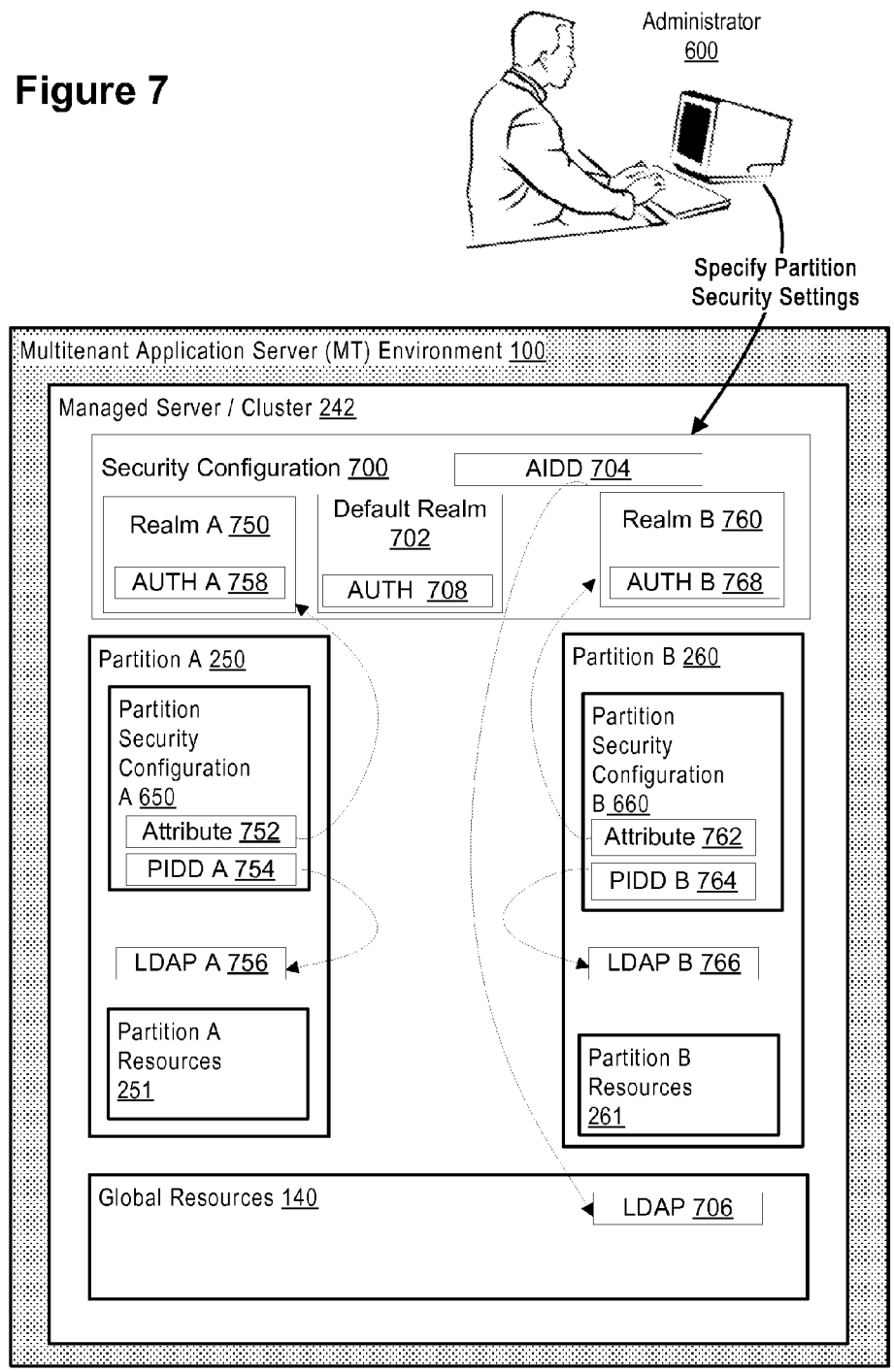
FIG. 7 illustrates a multi-tenant environment configured for the use of multiple realms in accordance with an embodiment.
Figure 8:
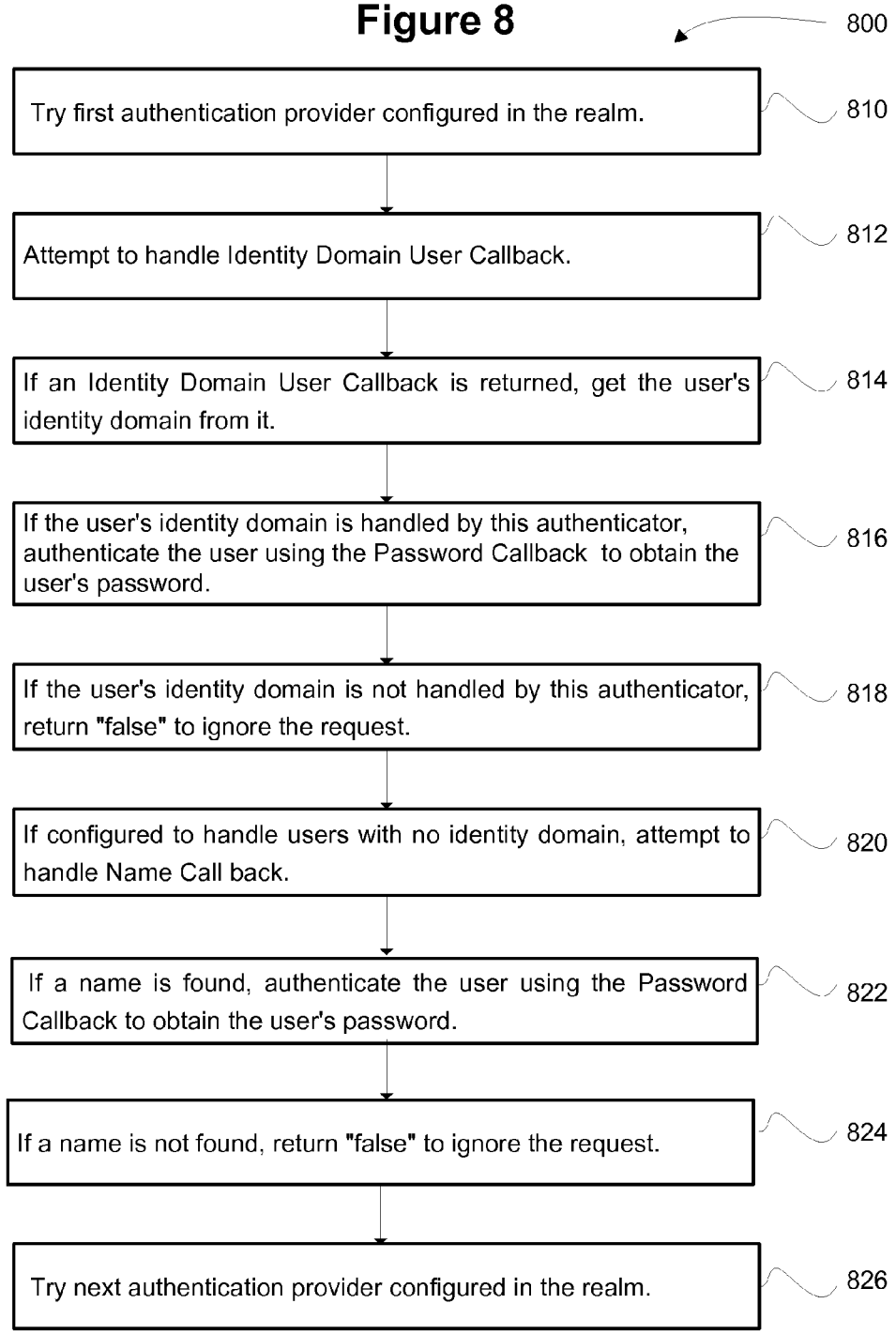
FIG. 8 illustrates an authentication method implemented by login modules in a multi-tenant environment having a plurality of identity domains in accordance with an embodiment.

In accordance with an embodiment, the present invention provides for per-partition configuration of security services including configuration for authentication, authorization, credential mapping, auditing, password validation, certificate validation, and user lockout in a multi-tenant server environment. Embodiments of the present invention also provide for access control for partition and global resources such that applications deployed to a particular partition are accessible only to users of the particular partition; partition configuration for a particular partition is only available to the particular partition's administrator (and WebLogic administrator); and partition administrators only have read-only access to globally-visible resources and configuration. FIGS. 1-5 and the accompanying text describe a multi-tenant application server environment. FIGS. 6-8 and the accompany text describe a system and method for supporting security in a multi-tenant server environments such as described, for example, with respect to FIGS. 1-5.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Application Server (e.g., Multi-Tenant, MT) Environment

Figure 1:
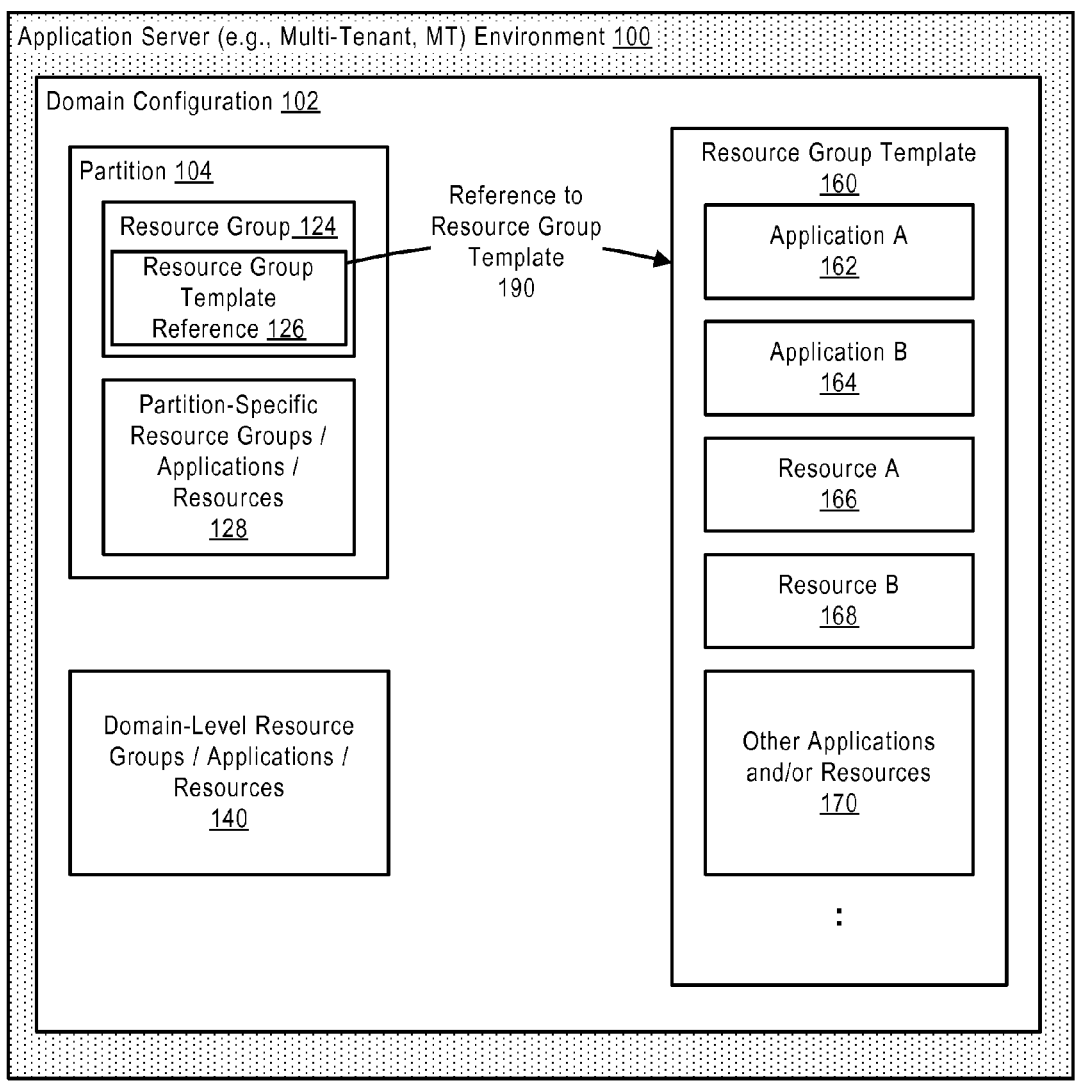
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
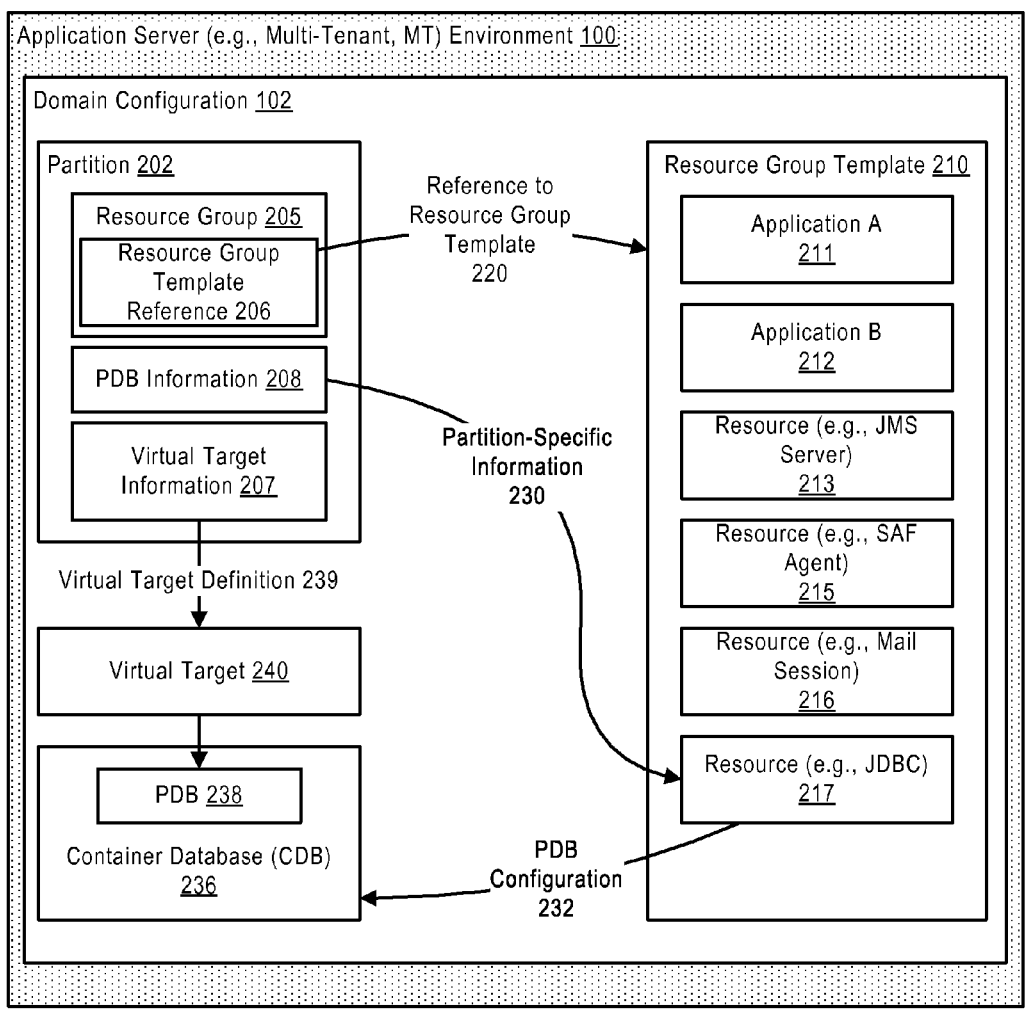
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to conFIG. 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
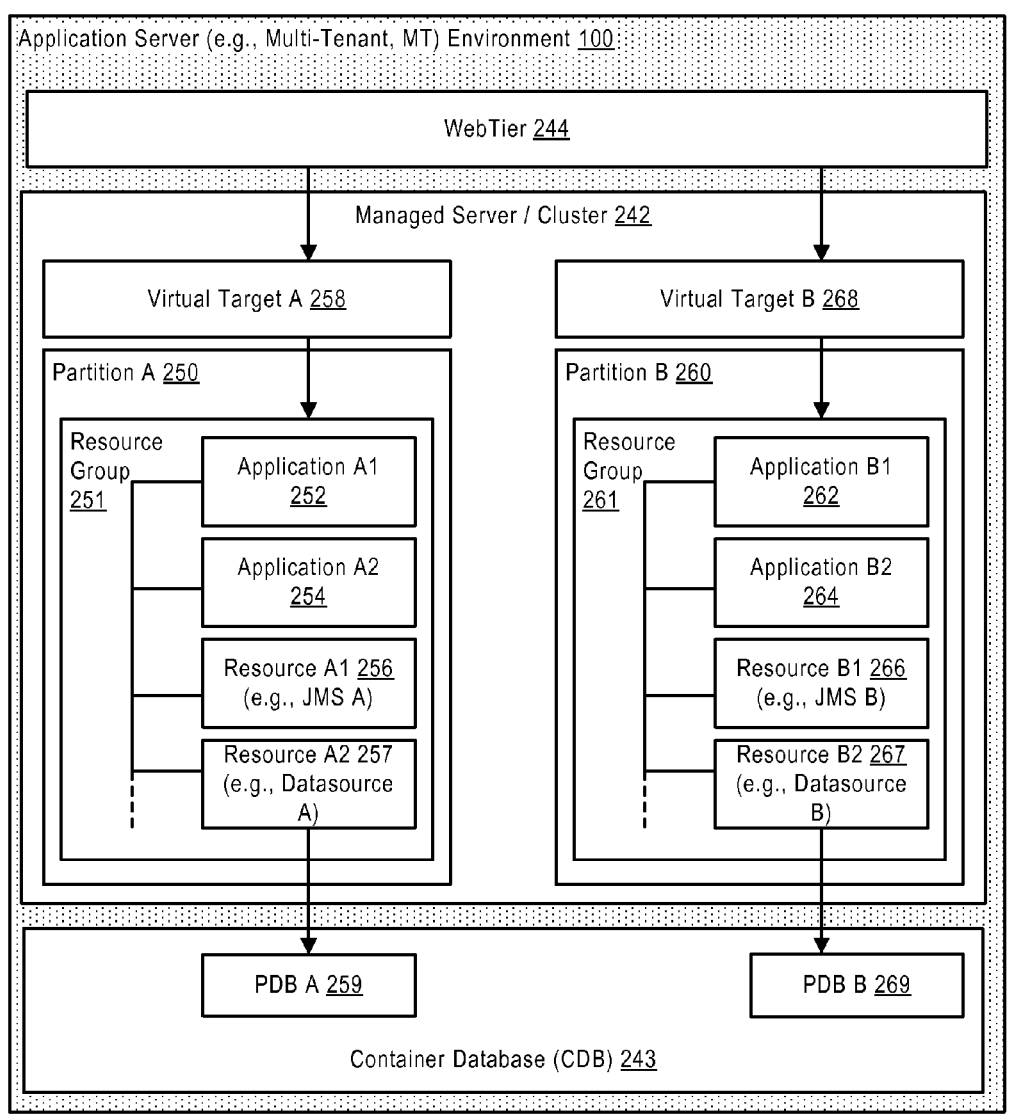
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
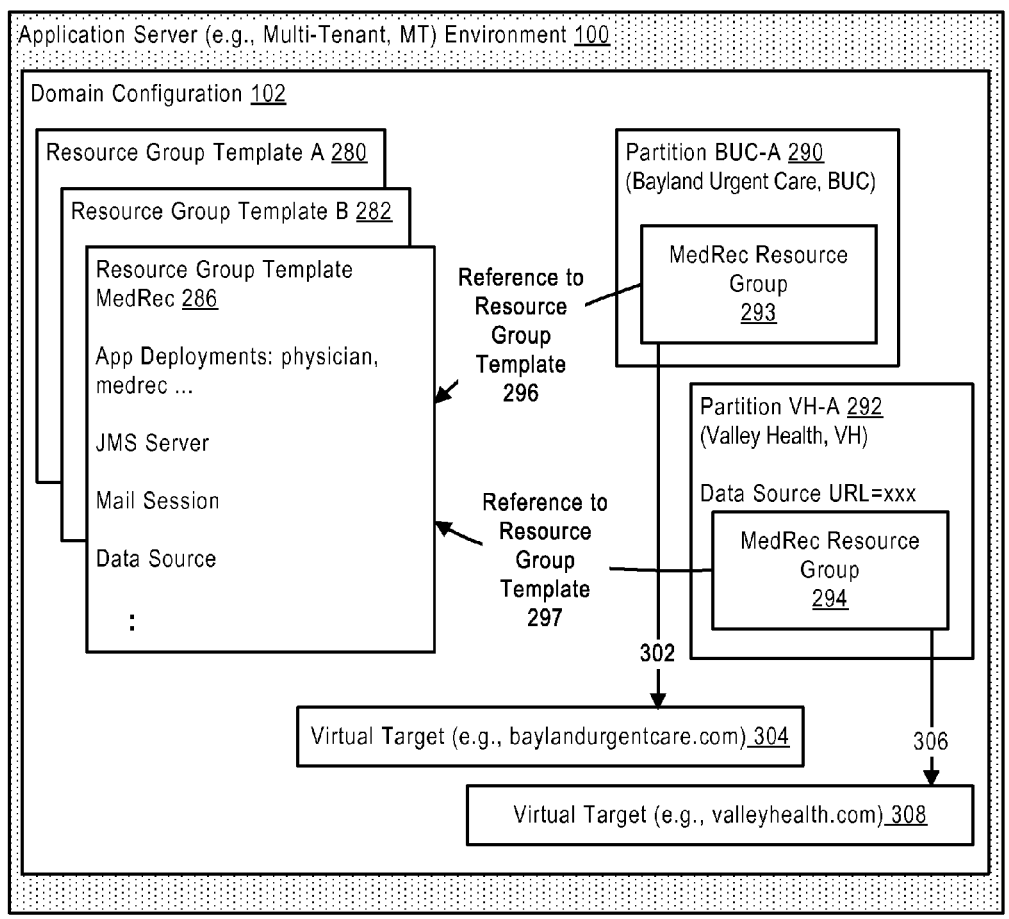
FIG. 4 illustrates an exemplary use of resource group templates, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
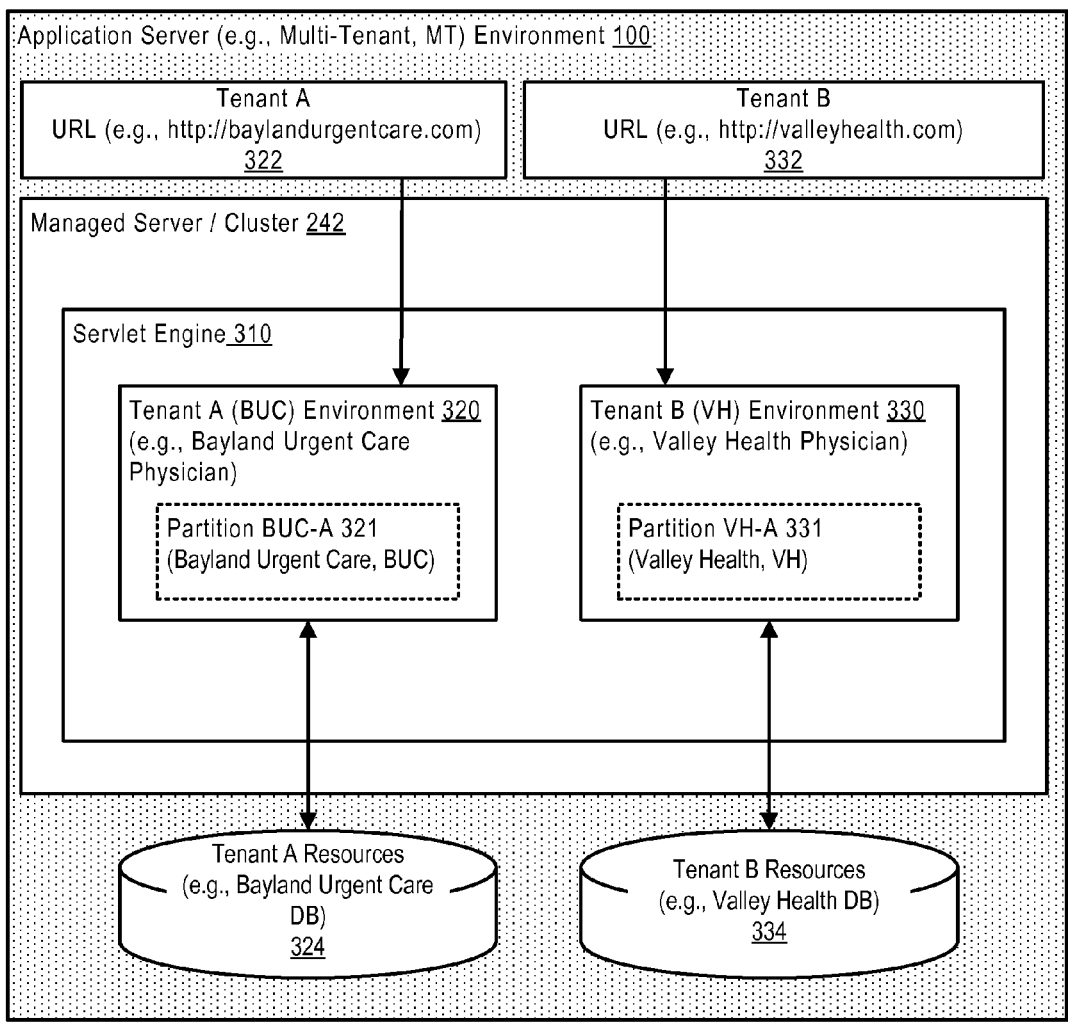
FIG. 5 illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Partition Security

The partition features described above provide isolation between individual partitions, and between partitions and the multitenant system that contains them. As described above, each partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers. It is desirable for security functions in the multitenant system to model this isolation and enforce access controls appropriately in order to secure applications and the system in a Partitioned/Multi-tenant environment. In accordance with an embodiment of the invention the system can include support for security in a multitenant application server environment. The system provides security services in support of the multitenant environment and the partition features described above.

Embodiments of the present invention provide for per-partition configuration of security services including configuration for authentication, authorization, credential mapping, auditing, password validation, certificate validation, and user lockout. Embodiments of the present invention also provide for access control for partition and global resources such that applications deployed to a particular partition are accessible only to users of the particular partition; partition configuration for a particular partition is only available to the particular partition's administrator (and WebLogic administrator); and partition administrators only have read-only access to globally-visible resources and configuration.

FIG. 6 illustrates general functionality of a system and method for supporting security in a multi-tenant environment in accordance with an embodiment. As shown in FIG. 6, each of Partition A 250 and Partition B 262 can be provided with a separated Partition Security Configuration A 650 and Partition Security Configuration B 660. The Partition Security Configuration A 650 provides for secured access to Partition A Resources 251 as well as limited access to global resources 140 for users and administrators of Partition A while preventing access to the Partition B Resources 261 by those administrators and users. A domain administrator 600 is allowed to initialize Partition Security Configuration for each domain to ensure access control for partition and global resources such that applications deployed to a particular partition are accessible only to users and administrators of the particular partition.

Embodiments of the present invention support and utilize an enhanced pluggable Identity Management IdM system which provides for the management of individual principals, their authentication, authorization, and control of privileges within or across system and partition boundaries. Particular embodiments of the present invention also provide administration services which provide the ability to designate one or more partition users as partition administrators for the particular partition.

The support provided for security in a multitenant server environment includes a number of features and behaviors, primarily related to realms and realm-based services, including:

Multiple Realms: Support for multiple active realms enables per-partition configuration for realm-based services, by allowing each partition to execute against a different realm. Partitions may also choose to share a security realm, with consequent loss of independence and isolation with respect to security configuration and metadata;

Identity Domains: An identity domain is a logical namespace for users and groups, typically representing a discrete set of users and groups in a physical store. Identity domains are used to identify the users associated with particular partitions, and for other purposes;

Partition-Aware Security Services: Partition-aware security services understand the partition context in which they're executing, so they can, for example, control access to a resource based on the partition that owns it. By definition, partition-aware services are also identity-domain-aware. Further details for these features and functional areas are described below.

Multiple Realm Support

A realm or security realm is a named configuration for security services in the system. Realms are used to configure authentication, authorization, role mapping, credential mapping, auditing, and other services for use in the multitenant server environment. Embodiments of the present invention provide for per-partition configuration of security services including configuration for authentication, authorization, credential mapping, auditing, password validation, certificate validation, and user lockout. The system supports multiple active realms. Each active partition may be associated with a different security realm. Thus, in the multi-tenant system provided by embodiments of the invention there can be multiple active configurations, corresponding to multiple realm runtimes and corresponding to multiple different partitions.

Security services provided by the system can be characterized as "realm-based" or "non-realm-based". Realm-based services are those services that are configured for a security "realm", as represented in configuration by a Realm object. Realm-based services include authentication, authorization, credential mapping, auditing, and several other services. Non-realm-based services are those services not configured on a Realm object. They include domain-wide services and settings configured on the Security Configuration object (child of the Domain object, parent container for the Realm objects), and various other services.

FIG. 7 shows a multitenant environment configured for the use of multiple realms. Partition security utilizes the security service to support multiple active realms. Multiple Realm object instances are managed as an array attribute on the Security Configuration object. As shown in FIG. 7, security configuration object 700 includes three realm objects: Realm A 750, Default Realm 702 and Realm B 760. Default Realm 702 represents the realm used by the domain/global runtime. However, Realm A 750 and Realm B 760 are also active at runtime. The default realm can also be referred to as the "admin realm", because it is used to perform authorization checks for system and administrative resources, and for other administrative purposes.

Each Partition security configuration has a Realm attribute that references one of the Realms configured on the Security Configuration object of the Domain Configuration. Thus partition security configuration A 650 includes a realm attribute 752 that references Realm A 750, and partition security configuration A 660 includes a realm attribute 762 that references Realm B 760. Methods are added to the Partition resources to support configuring a security realm for the partition. Each Partition security configuration must have a realm reference which is valid (which also implies that a realm cannot be deleted if it is referenced by a partition). Only system administrator 600 can change a partition's realm reference—partition administrators cannot. A partition must be stopped before its realm reference can be changed.

The mapping of partitions to realms is completely flexible: Every partition can reference a different realm, all partitions can share the same realm, or some partitions can reference different realms while others share a realm. Any combination is possible. Configuring a separate realm for each partition provides the most independence and isolation for the partition. Sharing a realm among multiple partitions can simplify configuration, and may be a good choice for related partitions that trust each other and have similar security configuration requirements. However, independence and isolation are reduced, and administrators of one partition can take actions that affect the other sharing partitions. Sharing the default/admin realm is allowed, but is not recommended. If the default realm is shared, care must be taken to avoid privilege escalation by/for partition administrators, because default policies will allow them to modify role mappings and authorization policies in the default realm.

A realm is created when the Realm object representing it is instantiated and added to the Realms array in the Security Configuration object by a system administrator. Creation of a new realm may occur either online or offline. Realm configuration is validated whenever a change is saved/activated, or, for offline changes, when the server boots. The Default Realm must be configured and valid for the server to boot. Creating a realm triggers creation of the runtime objects necessary to manage the realm's runtime lifecycle. Once created, a realm is available for use. It can be referenced by partitions, or by the domain/global runtime, and runtime code can request its services. A created realm may be started, stopped, or restarted any number of times, in response to usage patterns and configuration changes.

A realm is started on demand, when it is needed to service requests, or for management purposes. In particular, when a partition is started, the partition's realm is also started (if it is not already running). Runtime references to realm services must remain valid for as long as the realm exists, even across realm restarts. Attempting to obtain or invoke on a service for a realm that does not exist will result in an error or exception. Attempting to obtain or invoke on a service for a realm that exists should always succeed, even if the realm must be started to satisfy the request, and even if the realm was started, stopped, or restarted after the service reference was obtained.

In a partitioned environment, there can be multiple active realms. Thus, a realm name is always specified when requesting a realm service. The realm name specified may identify a particular realm or the default realm. A realm name parameter is a string value that identifies the realm for which the service is requested. The correct realm to use, for most service invocations, depends on the caller's partition context, the service and method being invoked, and the parameters of the call. Where the default realm is specified logic is applied to select the correct realm by "service proxies" that evaluate the context of each call, determine the correct realm to delegate to, and invoke the appropriate service in that realm. Encapsulating realm selection in this way avoids the need for calling code to implement complex logic, or cache references to services from multiple realms. Runtime code obtains references to realm-based security services from the Security Service Manager. Most callers obtain references for the services they need once, when they initialize, and keep those references for as long as they're needed.

The Security Service Manager returns service proxies in place of direct references to realm services. Service proxy behavior will vary based on the realm name given when requesting a service. When the actual name of an existing realm is specified, the returned proxy will be hard-wired to delegate to that specific realm. Hard-wired proxy services delegate all requests to the configured realm. The code snippet below illustrates how a caller might get a reference to the Principal Authenticator service.

import weblogic.security.service.PrincipalAuthenticator;
   import weblogic.security.service.SecurityServiceManager;
   PrincipalAuthenticator
      pa=SecurityServiceManager.getPrincipalAuthenticator (kernelID, realmName);

As illustrated, the caller requests Principal Authenticator service for the identified realm name. The system security service returns a realm service proxy reference which depends on the realm specified.

When the "default" realm is specified in a security service request, the returned proxy for the service will provide context-sensitive (or "auto-select") behavior, in order to select the correct proxy to return. Auto-select proxy services delegate some requests to the realm configured for the current partition, while delegating other requests to the default/admin realm. Authentication services are always local and are delegated to the realm of the current partition. Authorization services are sometimes local and delegated to the realm of the current partition e.g. for partition resources such as Servlet or EJB resources. Authorization services are sometimes global and delegated to the rdefault/admin realm e.g. for global resources such as system resources, e.g., JMX and Admin resources. Audit services are always local and are delegated to the realm of the current partition. Realm services use the audit service from their own realm to audit themselves, Credential Mapping services, Certificate Building/Validation, Password Validation, and User Lookout are always local and are delegated to the realm of the current partition.

Identity Domains

An Identity Domain (IDD) is a logical namespace for users and groups. Identity domains are used to identify and distinguish different sets of users. An identity domain can represent users from a particular company (e.g., "Acme Corp" IDD), or from a department within that company (e.g., "HR Dept" IDD). In a cloud environment, identity domains can distinguish system administrators from customer service representatives, and distinguish both from tenant users. Identity domains are necessary to distinguish users from different partitions, and to attribute ownership of resources. They are therefore an enabling technology for role-mapping and authorization policies that can distinguish one partition from another, and for other services that must distinguish users or resources from different partitions. Identity domains are thus intended to be used in essentially all partitioned environments.

The logical namespace represented by an identity domain has physical manifestation in the structure/topology of the corresponding user store. The physical representation of identity domain can be anything supported by the target user store technology—for example, a separate LDAP instance for each identity domain, or an identity domain field added to user records in a database. In the case of Shared IdM/Oracle Public Cloud (OPC), identity domains are represented as distinct sub-trees in the Users and Groups hierarchies of a single Oracle Internet Directory (OID) instance.

In the multitenant server environment, identity domains serve as a connection/alignment point between "tenants" and "partitions". A single identity domain represents a tenant's users (i.e., there is a 1-1 mapping between tenants and identity domains). This means that a particular partition can effectively be "assigned to", or "owned by", a tenant, if it is configured to use the identity domain associated with the tenant. That is, the tenant's users will be able to access the partition, while other tenants' users will not.

Partition Primary Identity Domains—Identity domains serve several purposes in a partitioned environment. First and foremost, they distinguish users associated with different partitions. Each partition is configured with a Primary Identity Domain (PIDD) that identifies the set of users associated with the partition. Default access policies allow those users—but not users from other identity domains—to access the partition. It is possible for multiple partitions to configure the same primary identity domain; however, the effect of doing so is to remove any distinction between users of those partitions. Users from the shared identity domain will be able to access all of the sharing partitions. The primary identity domain also serves to indicate the "ownership" of a partition's resources in a form that is convenient for writing role mapping and authorization policies. Treating the partition's resources as if they are "owned" by the partition's identity domain allows for easy comparisons between a user's identity domain and a resource's identity domain. When identity domains are in use, one identity domain must be designated as the Administrative Identity Domain (AIDD) for the domain. This is effectively the Primary Identity Domain for the domain. It is identity domain to which system administrators belong, and to which "ownership" of system and administrative resources is attributed.

FIG. 7 shows a multi-tenant server environment 100 in which identity domains are in use. As shown, in FIG. 7, the configuration 650 of partition A 250 includes identification of a primary identity domain PIDD A 754. PIDD A 754 is associated with LDAP A 756. The configuration 660 of partition B 260 includes identification of a primary identity domain PIDD B 764. PIDD B 764 is associated with LDAP B 766. The domain level security configuration references the administrative identity domain AIDD 704. AIDD 704 is associated with LDAP 706. Note that while illustrated using independent LDAP directories in FIG. 7, the user store for each identity domain is configurable. Depending on the tenant needs or existing user store provided by the tenant. The user store can be internal or external to the multi-tenant environment 100. Alternatively, PIDD A 754 and PIDD B 766 may, for example, refer to separate subtrees of LDAP 706, or an identity domain field added to user records in a database. The primary identity domain reference allows for configuration of a pluggable interface which handles call to whatever user store is associated with the primary identity domain. Different partitions may use different types of user stores.

Identity domains are considered to be "in use" if at least one identity domain is configured in the multitenant server environment. When Identity Domains Are In Use—Identity domains are always "enabled", in the sense that principals always carry an identity domain field, and authentication providers can always create principals with non-null/non-empty identity domain values. Identity domains are configured in the Administrative Identity Domain attribute of the Security Configuration object, the Primary Identity Domain attribute of each Partition object in the system, and the Identity Domain attribute of identity-domain-aware authentication provider(s) configured in the system. If any of these attributes is set to a non-null, non-empty value, then identity domains are considered to be in use.

If identity domains are in use, then: The Administrative Identity Domain must be set (checked by configuration validation) and every partition must configure a Primary Identity Domain (checked by configuration validation). All role mapping, authorization, credential mapping, and audit providers configured in the system, for any realm, must implement the Identity Domain Aware Provider marker interface (checked at realm start time). Authentication providers are configured in the default/admin realm and each partition's realm that can authenticate users from the appropriate identity domains (this is not checked by configuration validation). Thus, using the example shown in FIG. 7, Realm A 750 must configure an authentication provider that can authenticate users from PIDD A 754, and Realm B 760 must configure an authentication provider that can authenticate users from PIDD B 764. Likewise default realm 702 must configure an authentication provider that can authenticate users from AIDD 704.

The use of identity-domain-aware providers can also be forced by setting the Identity Domain Aware Providers Required attribute of the Security Configuration object. Setting this attribute to true will force all role mapping, authorization, credential mapping, and audit providers to support the Identity Domain Aware Provider interface, even if no identity domains are configured in the system.

Security Provider (SSPI) Interfaces providers should be identity-domain-aware to function correctly in a partitioned environment—or, more precisely, in an environment where identity domains are configured into the system. For example, an authorization provider that doesn't understand identity domains cannot correctly distinguish between two users with the same name but different identity domains, and therefore can't make valid authorization decisions. When identity domains are in use, or the Identity Domain Aware Providers Required attribute is set to true, then all providers of the following types must be identity-domain-aware, and implement the marker interface:

Role Mapping
Authorization
Credential
Mapping Audit

Along with implementing the marker interface, identity-domain-aware providers handle user and group principals properly when they carry identity domain values, including accounting for identity domain when testing for equality, and constructing map keys that account for identity domain. Identity-domain-aware must also account for resource ownership properly as described in the Authorization section below.

Authentication

As described above, the Identity Domain (IDD) is a logical namespace for users and groups. Identity domains are used to identify and distinguish different sets of users. Identity domains are necessary to distinguish users from different partitions, and to attribute ownership of resources. They are therefore an enabling technology for role-mapping and authorization policies that can distinguish one partition from another, and for other services that must distinguish users or resources from different partitions. Accordingly, when users are authenticated, it is necessary that they are authenticated with respect to a particular identity domain. As an example, the authentication mechanism must distinguish John Smith user of Partition A must be distinguished from John Smith user of Partition B. Thus, users are authenticated with respect to user name and the identity domain to which the user belongs.

Security services provided by the system can be characterized as "realm-based" or "non-realm-based". Realm-based services are those services that are configured for a security "realm", as represented in configuration by a security realm object. Authentication is a realm-based security services configured on a realm object.

In embodiments of the invention, a system is provided to provide authentication of principals with in a multitenant environment utilizing identity domains. Basic types (callbacks, principals) are provided which properly represent identity domains. Application programming Interfaces are provided which enable containers and applications to specify users' identity domains. Additionally, services and providers include features which support authentication against identity domains, and proper handling of the resulting subjects and principals.

In a multitenant environment utilizing identity domains the principals are defined by user name and the identity domain with which the user is registered. An interface identifies principals that carry identity domain information, and declares a method to get the associated identity domain. A class is used to implement this interface and carries identity domain information. Both the name and identity domain of a principal are used in comparisons. Principal signatures cover both the name and identity domain fields. A Principal Factory class supports creating user and group principals with identity domain values.

Two callbacks, Identity Domain Use Callback and Identity Domain Group Callback, are provided which allow the representation, respectively, of a user name with associated identity domain, and a set of group names, each with an associated identity domain. Callback Handlers are provided to support handling the new callbacks. Taken together, the callbacks and callback handlers allow applications and containers to specify the identity domains of users they are authenticating, and allow authentication services and providers to access the identity domain information of users during authentication.

Application programming interfaces that take user credentials as a Callback Handler can readily support identity domains using the callback handler capable of handling the Identity Domain User Callback which allows the representation of a user name with associated identity domain. Legacy authentication APIs which use username strings instead of callbacks are modified such that they can use a Callback Handler argument in order to support Identity Domain User Callback and Identity Domain Group Callback.

The servlet container's (see FIG. 3) form login implementation is extended to support a new identity domain parameter so that login forms can collect (or otherwise determine) a user's identity domain, and pass it to the container along with the standard user and password. Thus, for example, a user accessing the Tenant A environment 320 would be provided with a logon form requiring user ID and password. A servlet container provides a default value (i.e., the current partition's primary identity domain value). Thus for example because the logon form is provided in the Tenant A environment 320 the logon data would be automatically associated with PIDD A 754 of Partition A 250 (see FIG. 7). The user would not be required to specify the identity domain. However, if a different identity domain value is specified it overrides the default value supplied by the container—the logon form in Partition A may not however be configured to allow selection of an identity domain other than the default identity domain for the partition.

Container authentication, along with several application authentication interfaces that take a String username parameter, automatically supply an identity domain when called in a partitioned environment. This behavior relies on the Primary Identity Domain value set for a partition, and ensures that legacy applications can authenticate correctly when running in a partition. No changes to applications are required. In order for the default identity domain behavior to work properly, container authentication cannot be attempted until the partition is discriminated and available to the execution context, for all protocols/containers.

The processing model for authenticating subjects in a multitenant system utilizing identity domains is similar to the conventional authentication function. Thus conventional authentication systems and methods may be utilized in combination with additional features to ensure that authentication providers are identity-domain-aware. Authentication providers must be aware of the identity domains they can authenticate, and ignore requests to authenticate for other identity domains. For example, a provider configured to authenticate for the "Acme" identity domain should only respond to requests to authenticate Acme users, ignoring users from other identity domains. Typically, the list of supported identity domains will come from a provider's configuration—so that administrators have control over the identity domains visible to the system—but this is not a requirement of the processing model. A single provider can authenticate for one identity domain or many, and may also authenticate users with no identity domain, if capable and configured to do so. Multiple authentication providers can be configured, each authenticating for one or more identity domains.

Referring to FIG. 7, for example, each of Realm A 750, Realm B 760 and Default Realm 702 may configure their own authentication provider. As shown Realm A 750 configures authentication provider Auth A 758, Realm B 760 configures authentication provider Auth B 768, and Default Realm 702 configures authentication provider Auth 708. Or, for example a single authentication provider may be configured which receives and uses identity domain information to ensure that users are authenticated with respect to the correct identity domain.

Authentication providers such as Auth A 758 and Auth B 768 identify the identity domain(s) they support. The authentication providers support only one identity domain per configured authentication provider instance. An SSPI interface—Identity Domain Authenticator—allows each authentication provider to configure/declare the identity domain(s) they support. Authentication providers that can authenticate identity domain users implement the interface and handle identity domain callbacks.

Authentication providers can be implemented utilizing the Java Authentication and Authorization Service (JAAS) processing model. JAAS can be used for two purposes: for authentication of users, to reliably and securely determine who is currently executing Java code, regardless of whether the code is running as an application, an applet, a bean, or a servlet; and for authorization of users to ensure they have the access control rights (permissions) required to do the actions performed. JAAS authentication is performed in a pluggable fashion. This permits Java applications to remain independent from underlying authentication technologies. New or updated technologies can be plugged in without requiring modifications to the application itself. An implementation for a particular authentication technology to be used is determined at runtime. The implementation is specified in a login configuration file.

Authentication providers are called in the order configured on the realm, and consistent with the JAAS control flags set for each authentication provider. Given the processing model described above, the most appropriate configuration for identity domain authenticators will normally be that each provider: a) handles a discrete, non-overlapping set of identity domains; and, b) is configured with the "SUFFICIENT" JAAS control flag. Other configurations are allowed, but must be considered carefully in light of the interaction between JAAS control flags and authentication providers that can choose to handle or ignore authentication requests based on the target identity domain.

FIG. 8 illustrates a method implemented by login modules in a multi-tenant environment having a plurality of identity domains in accordance with an embodiment. Login Modules of the authentication providers in a multitenant server environments with multiple identity domains determine whether to handle an authentication request by attempting to handle callbacks, using the method illustrated in FIG. 8. At step 810, the Callback is provided to the first authentication provider configured on the realm. At step 812, the authentication provider attempts to handle Identity Domain User Callback. At step 814, if an Identity Domain User Callback is returned, the authentication provider gets the user's identity domain from it. At step 816, if the user's identity domain is handled by this authenticator, authenticate the user. Password Callback is used to obtain the user's password. At step 818, if the user's identity domain is not handled by this authenticator, return "false" to ignore the request. At step 820, if the authentication provider is configured to handle users with no identity domain, the authentication provider attempts to handle Name Call back. At step 822, if a name is not found, return "false" to ignore the request. At step 824, if a name is found, authenticate the user. Password Callback is used to obtain the user's password. At step 826, if the authentication provider was unable to authenticate the user, the system tries the next authentication provider configured on the realm (if any). If the first Login Module ignores the request, the request is then passed on to another Login Module which attempts to handle the request. Authentication providers are called in the order configured on the realm until the request is handled or fails.

Identity assertion providers are authentication providers that authenticate users based on tokens or credentials other than username and password; for example, SAML assertions, Kerberos tickets, or cookie-based session tokens. They do not handle callbacks. Instead, they determine a user's identity—username, group memberships, etc.—by validating the user's token and examining its contents. The user information obtained is returned in the form of a Callback Handler, which is ultimately passed to the Login Module chain to populate the appropriate principals to the user's subject.

As with other authentication providers, identity assertion providers used in a partitioned environment are configured to be identity domain-aware, and implement the appropriate Identity Domain Authenticator interface to declare their identity domain support. They can determine, from configuration or from an asserted token, what identity domain to assert for a user (and, potentially, for any asserted groups). When asserting a user with an identity domain, the returned Callback Handler is configured to handle Identity Domain User Callback and, optionally, Identity Domain Group Callback.

Login Modules preferably use a Principal Factory to create principals. The factory provides methods to create principals with identity domain information. If instantiating principals directly, identity domain must be provided using the appropriate constructor or setter method(s). The principal validation service signs all principals at authentication time, and validates the signatures of principals coming into the system to ensure they were originally authenticated by the local domain. The actual signing/validation is delegated to Principal Validator providers.

Principal validation is a realm-based service, which means that different realms can validate principals differently. Doing so would allow principals authenticated by one realm to be distinguished from principals authenticated by a different realm. While this behavior could potentially be useful in many scenarios, it is not essential. For example, the multitenant system can use a single signing key—the "domain credential"—that is configured on the domain, and is thus domain-wide in scope. Thus principals are signed with the same key regardless of which realm authenticated them. In alternative embodiments, different signing keys can instead be utilized by different realms.

Principal and Identity Assertion Caches. Each realm maintains a Principal cache and an Identity Assertion cache. The first is a cache of signed principals that is used to avoid signing the same principal repeatedly, since signing is a relatively expensive operation. The cache key is preferably the user name and identity domain so that principals from different identity domains are not confused. The second is a cache of Subjects resulting from identity assertion. This cache is implemented to avoid repeatedly querying LDAP (or other user stores) to fetch user information (group memberships, etc.) when the same user identity is repeatedly asserted. Like the principal cache, the cache key is preferably the user's name and the user's identity domain so that principals from different identity domains are not confused.

Authorization

In an embodiment, the multitenant server environment implements a role-based access control (RBAC) model, supported by an authorization subsystem consisting of both a role mapping service and an authorization service. The two services are largely independent, but the authorization service calls the role mapping service to determine a user's roles when making an authorization decision with respect to a particular identified resource. Both the role mapping service and the authorization service delegate to security support providers that provide the actual role mapping and authorization functionality.

Security services provided by the system can be characterized as "realm-based" or "non-realm-based". Realm-based services are those services that are configured for a security "realm", as represented in configuration by a security realm object. Authorization is a realm-based security services configured on a realm object.

The security support providers implement a number of policy "predicates" that can be used in role mapping and authorization rules. These predicates grant a role, or directly grant access to a resource, if a particular condition is met: for example, if principals in the subject match a specific user or group name, or the request originated from a specific IP address. Predicates can be combined using logical AND, OR, and NOT semantics. Support for RBAC is provided by the role predicate, which is used in authorization rules to grant access if a user has a specified role. In the RBAC model, the primary determinant of access is whether a user has, or doesn't have, a given role.

The predicate used most often for role mapping is the group predicate, which grants a role based on membership in a particular group. The WebLogic administrative role mappings use this predicate, granting, e.g., "Admin" role to members of the "Administrators" group. Use of the user predicate (matching a specific user name) is less common. Additional predicates, such as IP address and time of day, are typically used to further constrain the role based on context. A "Bank Teller" role, for example, might be granted to members of the "Tellers" group, but only during hours the bank is open for business.

In a partitioned environment, access control takes on an additional dimension. Users, groups, and resources are now associated with partitions, and access decisions take into account both a user's identity domain, and the partition that a resource belongs to, in addition to the users' identity and role. Two new features/behaviors enable partition-aware access control. First new predicates are provided that compare users and groups taking identity domain into account. Second identity domains are used to represent the partition ownership of a resource. Thus both the users and resources are associated with identity domains. Thus, an authorization decision can be made by the authorization providers which determines whether a particular user has the correct role in the correct identity domain to access a resource associated with an identity domain.

Resources really belong to partitions, not identity domains as shown, for example, in FIG. 3. However, representing resource ownership as an identity domain is advantageous because it provides for direct comparison between resource identity domains and user/group identity domains when making authorization decisions. A simple string comparison can determine whether two identity domains do or don't match. An approach where partitions were compared against identity domains to determine a "match" would require restrictive naming conventions, mapping tables, or both, and would be less efficient at runtime. The identity domain mapping for a partition is configured on the Primary Identity Domain attribute of the Partition object see, e.g., PIDD A 754 and PIDD B 764 of FIG. 7. A further benefit of using identity domain to represent resource ownership is that it does not tie the model to partitions—thus identity domains could also be used for control of resource authorization in a non-partitioned environment.

The following predicates provide support for identity domain-aware user and group matching. The predicates are available for both role mapping and authorization rules, but are expected to be used primarily for role mapping, consistent with WebLogic's RBAC model.

which allow a determination not only of whether the user is in role for accessing the resource called but also a determination whether the User IdD 912 matches the Resource IdD 916. Processes calling a resource provide the resource identity domain value that identifies the ownership of the resource for which access is requested. The authorization providers are thus enabled to compare user identity, user identity domain and user role against the resource and resource identity domain ownership to make authorization decision using the identity domain aware predicates.

Partition security adds one new method, three new Context Handler attributes, and a Context Handler wrapper class to the authorization and role mapping APIs. A new is User In Role( ) method on the Role Manager interface allows a caller to directly determine whether a user is in a specific role, passing a Resource and a Context Handler as input to the query. Three new Context Handler attributes allow a caller to specify resource ownership information for resources when calling authorization and role mapping APIs: RESOURCE_PARTITION (partition name) indicates the owning partition for a resource. RESOURCE_OWNERSHIP_DEFAULT indicates that the current partition, as determined by the caller context, owns the resource. RESOURCE_IDENTITY_DOMAIN allows the caller to specify a partition identity domain as the resource owner. A new Context Handler wrapper class, Resource IDD Context

| Predicate | Rule Expression | Description |
| --- | --- | --- |
| IDDUser(user, idd) | User.name == user && User.idd == idd | Matches the specified user from the specified identity domain. Analogous to the existing user predicate, but only matches if the user is from the specified identity domain. |
| IDDGroup(group, idd) | Group.name == group && Group.idd == idd | Matches the specified group from the specified identity domain. Analogous to the existing group predicate, but only matches if the group is from the specified identity domain. |
| OwnerIDDUser(user) | User.name == user && User.idd == Resource.idd | Matches the specified user if the user's identity domain matches the resource owner's identity domain. |
| OwnerIDDGroup(group) | Group.name == group && Group.idd == Resource.idd | Matches the specified group if the group's identity domain matches the resource owner's identity domain. |
| AdminIDDUser(user) | User.name == user && User.idd == Admin.idd | Matches the specified user if the user's identity domain matches the administrative identity domain. |
| AdminIDDGroup(group) | Group.name == group && Group.idd == Admin.idd | Matches the specified group if the group's identity domain matches the administrative identity domain. |

Figure 9:
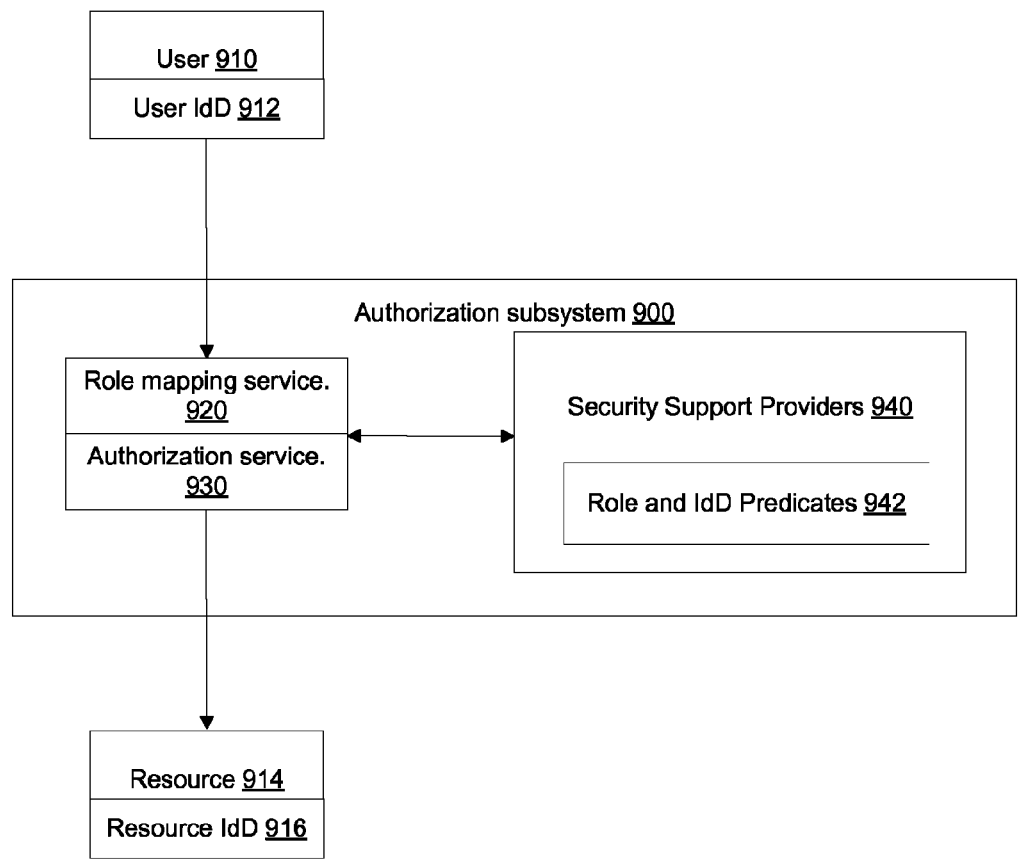
FIG. 9 illustrates an authorization subsystem implemented in a multi-tenant environment having a plurality of identity domains in accordance with an embodiment.

FIG. 9 illustrates an authorization subsystem implemented in a multi-tenant environment having a plurality of identity domains in accordance with an embodiment. As shown in FIG. 9, a user 910 associated with an identity domain 912 attempts to access a resource 914 associated with an identity domain 916. The wrapper class is used to specify these values. The wrapper class will determine the current partition, if necessary, and convert the supplied ownership value to a resource identity domain value for use by the role mapping/authorization providers. The wrapper also ensures that the correct resource identity domain value is supplied. Access to the resource is controlled by an authorization subsystem 900 comprising a role mapping service 920 and authorization service 930. The role mapping service 920 and authorization service 930 delegate to security support providers 940 that provide the actual role mapping and authorization functionality. Security support providers 940 implement predicates 942 which provide rules Wrapper, which callers can use to decorate an existing Context Handler instance with the appropriate identity domain ownership information.

As noted in the discussion of multiple realms, containers interact with security services through proxy services that direct requests to the correct realm at runtime. In the case of the Authorization Manager and the Role Manager, the proxy will select the correct realm using logic that takes the resource type and ownership into account. For resources owned by the current partition—e.g., application resources—the "local" realm will be used. For system resources—e.g.—the default/global realm will be used. It will then determine whether to call the authorization/role mapping service for the local partition's realm or for the default/global realm depending on the resource type.

The use of identity domain-aware predicates makes possible scoped roles—roles that are valid only in the context of a specific identity domain. Using the Owner IDD Group predicate, Partition Admin role can be granted to users who are members of the Partition Administrators group for the identity domain that owns the resource for which access is requested. (Resource is a parameter for role queries as well as authorization queries.) Tenant Admin role can be granted in a similar manner. The following new role policies will be provisioned to realms in partitioned domains: Note that tenant-based role mappings can be provisioned by the layered components that need them.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a machine readable storage medium or computer readable storage medium (media) having instructions stored thereon/in which can be used to program a computer to perform any of the methods, processes or steps of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In some embodiments, the storage medium is a non-transitory machine readable storage medium or non-transitory computer readable storage medium.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for providing security in a multitenant application server environment (MASE) comprising a plurality of partitions, a plurality of partition resources and a plurality of global resources, the method comprising:
    defining a plurality of security realms in the MASE, including an admin security realm, a first security realm, and a second security realm;
    configuring a first partition of the plurality of partitions of the MASE to have a first plurality of partition resources of the plurality of partition resources of the MASE;
    configuring a second partition of the plurality of partitions of the MASE to have a second plurality of partition resources of the plurality of partition resources of the MASE;
    providing a first security configuration associating the first partition with the first security realm;
    providing a second security configuration associating the second partition with the second security realm;
    associating a first primary identity domain with the first partition, wherein the first primary identity domain represents a first plurality of users associated with a first tenant;
    associating each of the first plurality of partition resources of the MASE with the first primary identity domain;
    associating a second primary identity domain with the second partition wherein the second primary identity domain represents a second plurality of users associated with a second tenant;
    associating each of the second plurality of partition resources of the MASE with the second primary identity domain;
    operating each of said admin security realm, first security realm, and second security realm simultaneously at runtime in the MASE to control authentication and authorization for access to said plurality of partition resources and said plurality of global resources;
    wherein said operating step includes providing an authorization service in the MASE which in response to receiving a call from a user to access a partition resource of the plurality of partition resources compares a primary identity domain associated with said user to a primary identity domain associated with said partition resource and authorizes access to said partition resource only if the primary identity domain associated with said user matches the primary identity domain associated with said partition resource;
    whereby the first plurality of users associated with the first tenant have access to the first plurality of partition resources of the first partition but not the second plurality of partition resources of the second partition; and
    whereby the second plurality of users associated with the second tenant have access to the second plurality of partition resources of the second partition but not the first plurality of partition resources of the first partition.

2. The method of claim 1, further comprising:
    configuring the first primary identity domain to reference a first identity store for storing a first representation of the first plurality of users associated with the first tenant; and
    configuring the second primary identity domain to reference a second identity store, different than the first identity store, for storing a second representation of the second plurality of users associated with the second tenant.

3. The method of claim 1, further comprising:
    configuring the first primary identity domain to reference a first portion of an identity store for storing a first representation of the first plurality of users associated with the first tenant; and
    configuring the second primary identity domain to reference a second portion of said identity store for storing a second representation of the second plurality of users associated with the second tenant.

4. The method of claim 1, further comprising:
    associating an admin identity domain with the multitenant application server environment, wherein the admin identity domain represents a plurality of system administrators of the multitenant application server environment; and
    whereby the plurality of system administrators associated with the multitenant application server environment have access to said plurality of global resources.

5. The method of claim 1, further comprising:
providing a first authentication service configured to authenticate the first plurality of users associated with the first tenant and generate first signed principals identifying said first primary identity domain in combination with one or more of said first plurality of users.

6. The method of claim 1, further comprising:
providing a first authentication service configured to authenticate the first plurality of users associated with the first tenant and generate first signed principals identifying said first primary identity domain in combination with one or more of said first plurality of users; and
providing a second authentication service configured to authenticate the second plurality of users associated with the second tenant and generate second signed principals identifying said second primary identity domain in combination with one or more of said second plurality of users.

7. A non-transitory computer-readable medium including instructions stored thereon for providing security in a multitenant application server environment (MASE) comprising a plurality of partitions having a plurality of partition resources and a plurality of global resources, which instructions, when executed, cause a system to perform steps comprising:
defining a plurality of security realms in the MASE, including an admin security realm, a first security realm, and a second security realm;
configuring a first partition of the plurality of partitions of the MASE to have a first plurality of partition resources of the plurality of partition resources of the MASE;
configuring a second partition of the plurality of partitions of the MASE to have a second plurality of partition resources of the plurality of partition resources of the MASE;
providing a first security configuration associating the first partition with the first security realm;
providing a second security configuration associating the second partition with the second security realm;
associating a first primary identity domain with the first partition, wherein the first primary identity domain represents a first plurality of users associated with a first tenant;
associating each of the first plurality of partition resources of the MASE with the first primary identity domain;
associating a second primary identity domain with the second partition wherein the second primary identity domain represents a second plurality of users associated with a second tenant;
associating each of the second plurality of partition resources of the MASE with the second primary identity domain;
operating each of said admin security realm, first security realm, and second security realm simultaneously at runtime in the MASE to control authentication and authorization for access to said plurality of partition resources and said plurality of global resources;
wherein said operating step includes providing an authorization service in the MASE which in response to receiving a call from a user to access a partition resource of the plurality of partition resources compares a primary identity domain associated with said user to a primary identity domain associated with said partition resource and authorizes access to said partition resource only if the primary identity domain associated with said user matches the primary identity domain associated with said partition resource;
whereby the first plurality of users associated with the first tenant have access to the first plurality of partition resources of the first partition but not the second plurality of partition resources of the second partition; and
whereby the second plurality of users associated with the second tenant have access to the second plurality of partition resources of the second partition but not the first plurality of partition resources of the first partition.

8. The non-transitory computer-readable medium of claim 7 including further instructions stored thereon, which when executed, cause a system to perform further steps comprising:
configuring the first primary identity domain to reference a first identity store for storing a first representation of the first plurality of users associated with the first tenant; and
configuring the second primary identity domain to reference a second identity store, different than the first identity store, for storing a second representation of the second plurality of users associated with the second tenant.

9. The non-transitory computer-readable medium of claim 7 including further instructions stored thereon, which when executed, cause a system to perform further steps comprising:
configuring the first primary identity domain to reference a first portion of an identity store for storing a first representation of the first plurality of users associated with the first tenant; and
configuring the second primary identity domain to reference a second portion of said identity store for storing a second representation of the second plurality of users associated with the second tenant.

10. The non-transitory computer-readable medium of claim 7 including further instructions stored thereon, which when executed, cause a system to perform further steps comprising:
associating an admin identity domain with the multitenant application server environment, wherein the admin identity domain represents a plurality of system administrators of the multitenant application server environment; and
whereby the plurality of system administrators associated with the multitenant application server environment have access to said plurality of global resources.

11. The non-transitory computer-readable medium of claim 7 including further instructions stored thereon, which when executed, cause a system to perform further steps comprising:
providing a first authentication service configured to authenticate the first plurality of users associated with the first tenant and generate first signed principals identifying said first primary identity domain in combination with one or more of said first plurality of users.

12. The non-transitory computer-readable medium of claim 7 including further instructions stored thereon, which when executed, cause a system to perform further steps comprising:
providing a first authentication service configured to authenticate the first plurality of users associated with the first tenant and generate first signed principals identifying said first primary identity domain in combination with one or more of said first plurality of users; and providing a second authentication service configured to authenticate the second plurality of users associated with the second tenant and generate second signed principals identifying said second primary identity domain in combination with one or more of said second plurality of users.

13. The non-transitory computer-readable medium of claim 7 including further instructions stored thereon, which when executed, cause a system to perform further steps comprising:
providing a first authentication service configured to authenticate the first plurality of users associated with the first tenant and generate first signed principals identifying said first primary identity domain in combination with one or more of said first plurality of users;
providing a second authentication service configured to authenticate the second plurality of users associated with the second tenant and generate second signed principals identifying said second primary identity domain in combination with one or more of said second plurality of users.

14. A multitenant application server environment system comprising:
an application server environment comprising a plurality of microprocessors and memory;
a plurality of partitions configured on said application server environment;
a plurality of partition resources and a plurality of global resources provided in said application server environment;
a plurality of security realms including an admin security realm, a first security realm, and a second security realm configured in said application server environment;
a first partition of the plurality of partitions configured to have a first plurality of partition resources of the plurality of partition resources;
a second partition of the plurality of partitions configured to have a second plurality of partition resources of the plurality of partition resources;
a first security configuration associating the first partition with the first security realm;
a second security configuration associating the second partition with the second security realm;
a first primary identity domain associated with the first partition, wherein the first primary identity domain represents a first plurality of users associated with a first tenant, and wherein the first plurality of partition resources is associated with the first primary identity domain;
a second primary identity domain associated with the second partition wherein the second primary identity domain represents a second plurality of users associated with a second tenant, and wherein the second plurality of partition resources is associated with the second primary identity domain;
an authorization service, provided by said application server environment, which in response to receiving a call from a user to access a partition resource of the plurality of partition resources compares a primary identity domain associated with said user to a primary identity domain associated with said partition resource and authorizes access to said partition resource only if the primary identity domain associated with said user matches the primary identity domain associated with said partition resource;
wherein said admin security realm, first security realm, and second security realm are configured to operate simultaneously at runtime to control authentication and authorization for access to said plurality of partition resources and said plurality of global resources;
whereby the first plurality of users associated with the first tenant have access to the first plurality of partition resources of the first partition but not the second plurality of partition resources of the second partition; and
whereby the second plurality of users associated with the second tenant have access to the second plurality of partition resources of the second partition but not the first plurality of partition resources of the first partition.

15. The system of claim 14, wherein:
the first primary identity domain is configured to reference a first identity store for storing a first representation of the first plurality of users associated with the first tenant; and
the second primary identity domain is configured to reference a second identity store, different than the first identity store, for storing a second representation of the second plurality of users associated with the second tenant.

16. The system of claim 14, wherein:
the first primary identity domain is configured to reference a first portion of an identity store for storing a first representation of the first plurality of users associated with the first tenant; and
the second primary identity domain is configured to reference a second portion of said identity store for storing a second representation of the second plurality of users associated with the second tenant.

17. The system of claim 14, further comprising:
an admin identity domain associated with the multitenant application server environment, wherein the admin identity domain represents a plurality of system administrators of the multitenant application server environment; and
whereby the plurality of system administrators associated with the multitenant application server environment have access to said plurality of global resources.

18. The system of claim 14, further comprising:
a first authentication service configured to authenticate the first plurality of users associated with the first tenant and generate first signed principals identifying said first primary identity domain in combination with one or more of said first plurality of users.

19. The system of claim 14, further comprising:
a first authentication service configured to authenticate the first plurality of users associated with the first tenant and generate first signed principals identifying said first primary identity domain in combination with one or more of said first plurality of users; and
a second authentication service configured to authenticate the second plurality of users associated with the second tenant and generate second signed principals identifying said second primary identity domain in combination with one or more of said second plurality of users.

* * * * *